No. 634,048. Patented Oct. 3, 1899.
J. G. WAGGONER.
WASHER FOR NUT LOCKS.
(Application filed June 3, 1899.)
(No Model.)
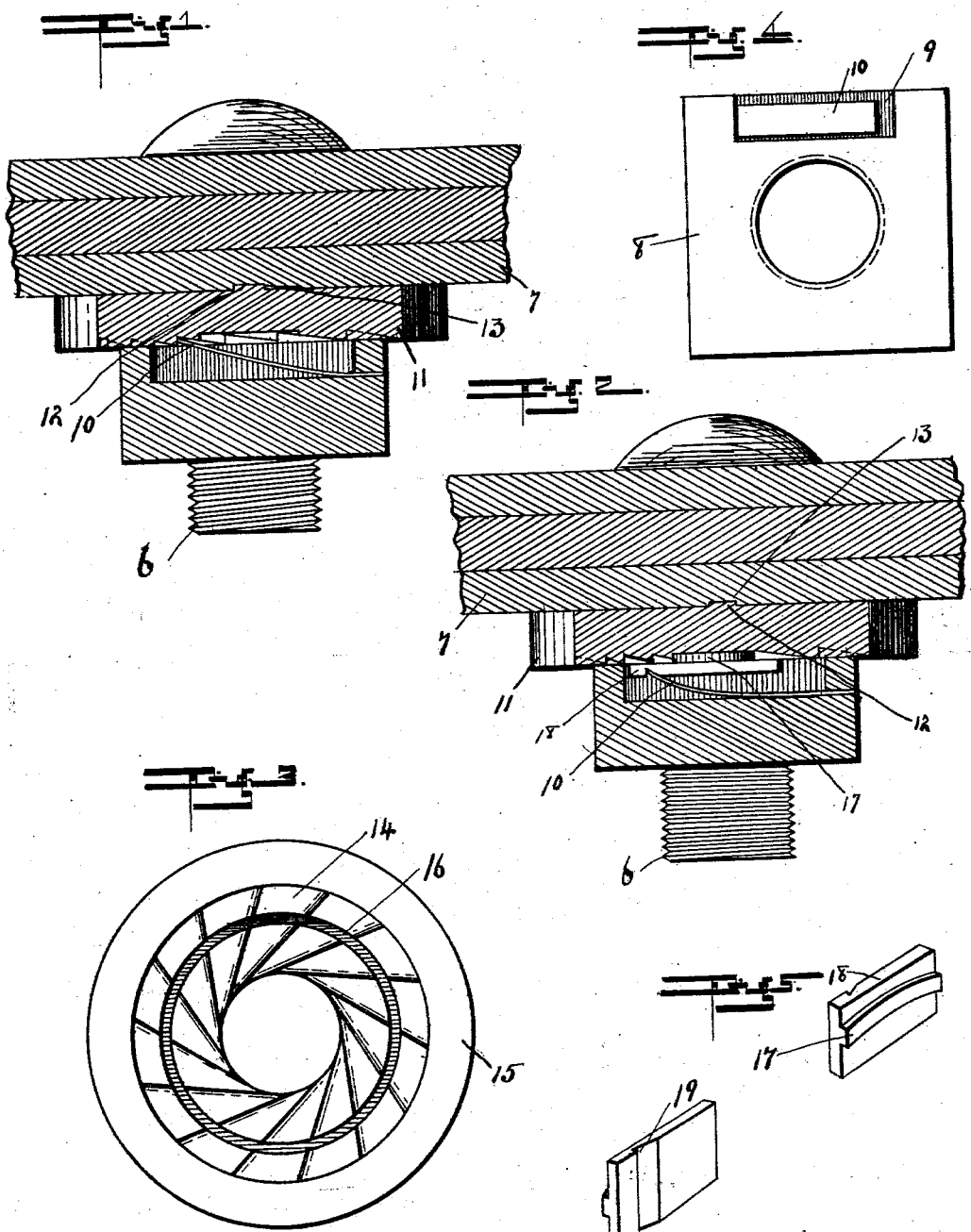
WITNESSES:
INVENTOR
James G. Waggoner
BY
Arthur M. Hood
ATTORNEY.

UNITED STATES PATENT OFFICE.

JAMES G. WAGGONER, OF JONESVILLE, INDIANA, ASSIGNOR OF ONE-HALF TO EUGENE T. MARTIN, OF COLUMBUS, INDIANA.

WASHER FOR NUT-LOCKS.

SPECIFICATION forming part of Letters Patent No. 634,048, dated October 3, 1899.

Application filed June 3, 1899. Serial No. 719,188. (No model.)

*To all whom it may concern:*

Be it known that I, JAMES G. WAGGONER, a citizen of the United States, residing at Jonesville, in the county of Bartholomew and State of Indiana, have invented a new and useful Washer for Nut-Locks, of which the following is a specification.

My invention relates to an improvement in washers for nut-locks.

The object of my invention is to produce a cheap and efficient washer for preventing the loosening of nuts upon their bolts.

Figure 1 is a horizontal section. Fig. 2 is a similar section showing the operative position of the nut-removing means. Fig. 3 is an elevation of one side of the washer. Fig. 4 is an elevation of the nut, and Fig. 5 two perspective views of a convenient removing-shoe.

In the drawings, 6 indicates a threaded bolt of the usual form, and 7 indicates a fish-plate or other body. The nut 8 is threaded in the usual manner and is provided on one face with a recess 9, in which is mounted a spring-finger 10.

The washer 11 is provided on one face with one or more lugs 12, which are adapted to enter recesses 13, formed in the outer face of plate 7. The other face of washer 11 is provided with a series of ratchet-teeth 14, said teeth being preferably formed in the bottom of a shallow circular depression, so as to form a shoulder 15 at the outer ends of the teeth, the said shoulder operating to prevent the outward misplacement of the free end of finger 10. In order to properly coöperate with finger 10, the crowns of teeth 14 should lie tangentially upon the washer, as shown, rather than radially. About midway of the length of teeth 14 I form a circular groove 16, which is adapted to receive a tongue 17, formed on one face of a shoe 18. The opposite face of shoe 18 is provided with a shoulder 19, adapted to be engaged by the free end of finger 10, and the shoe is of such length that it may be dropped into recesses 9 between the washer and the free end of the spring-finger.

In operation the washer is placed in position with its lugs 12 lying in recesses 13, and the nut is then screwed on with spring-finger 10 adjacent the washer. As the nut is brought home finger 10 rides over the ratchet-teeth of the washer, thus preventing any return movement of the nut, so that the nut is firmly held in position. In order to remove the nut, shoe 18 may be forced down between the free end of finger 10 and the washer, tongue 17 thereof lying in groove 16 and the free end of the tongue engaging shoulder 19. The shoe being of a length greater than the distance between two of the ratchet-teeth rides freely over said teeth, so that the nut may be easily removed.

It will be readily understood that in some cases the inner face of the washer may be merely roughened instead of being provided with the lugs shown.

I claim as my invention—

1. As an article of manufacture, a washer for nut-locks, having a series of ratchet-teeth formed on one face thereof, and a circular groove crossing said teeth.

2. As an article of manufacture, a washer for nut-locks, having a circular depression formed in one face, a series of tangentially-arranged ratchet-teeth formed on the bottom of said depression, and a circular groove crossing said teeth.

JAMES G. WAGGONER.

Witnesses:
EUGENE T. MARTIN,
ARTHUR M. HOOD.